No. 648,242. Patented Apr. 24, 1900.
J. A. CRONKHITE.
STERILIZER FOR DENTAL OR SURGICAL INSTRUMENTS.
(Application filed Sept. 9, 1899.)
(No Model.)
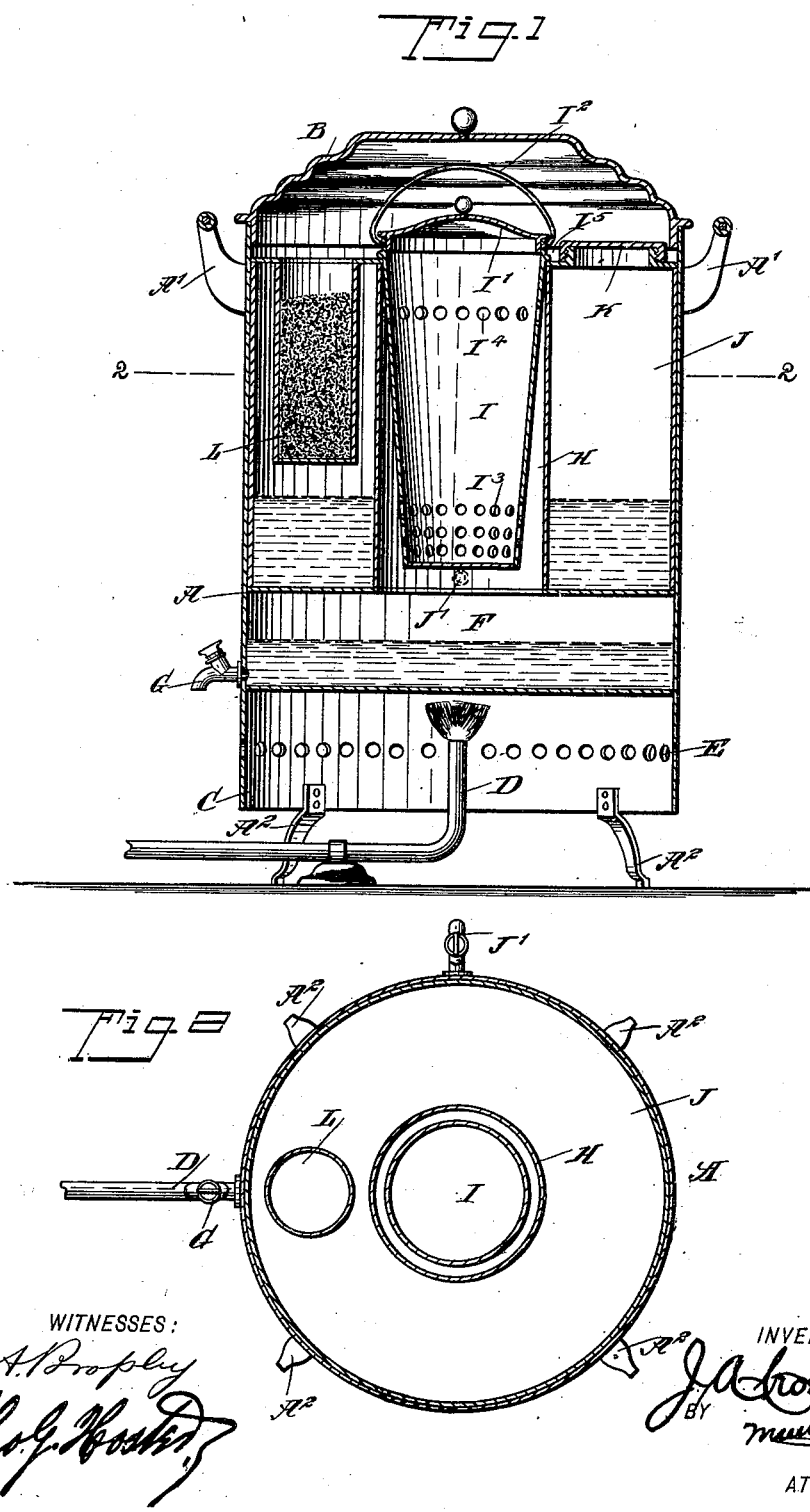
WITNESSES:
INVENTOR
ATTORNEYS

UNITED STATES PATENT OFFICE.

JAMES ALBERT CRONKHITE, OF LOS ANGELES, CALIFORNIA.

STERILIZER FOR DENTAL OR SURGICAL INSTRUMENTS.

SPECIFICATION forming part of Letters Patent No. 648,242, dated April 24, 1900.

Application filed September 9, 1899. Serial No. 729,935. (No model.)

*To all whom it may concern:*

Be it known that I, JAMES ALBERT CRONKHITE, of Los Angeles, in the county of Los Angeles and State of California, have invented a new and Improved Sterilizer and Heater, of which the following is a full, clear, and exact description.

The object of the invention is to provide a new and improved sterilizer and heater for dental and surgical apparatus and arranged to insure a perfect sterilization of dental and surgical instruments and to furnish warm water for washing and other purposes and a heated antiseptic solution for sterilizing hypodermic syringes and other instruments.

The invention consists of novel features and parts and combinations of the same, as will be fully described hereinafter, and then pointed out in the claims.

A practical embodiment of my invention is represented in the accompanying drawings, forming a part of this specification, in which similar characters of reference indicate corresponding parts in both the views.

Figure 1 is a sectional side elevation of the improvement, and Fig. 2 is a sectional plan view of the same on the line 2 2 in Fig. 1.

The improved apparatus is provided with a shell A, preferably made cylindrical and having handles A' near the upper end for conviently moving the apparatus about and legs A² at the lower end for supporting the shell on a table or other support. The top of the shell A is adapted to be closed by a cover B, and the lower end of the shell is formed into a burning-chamber C, open at the bottom and having draft-openings E in the side wall of the chamber. Into this chamber extends a burner D, of any approved construction, connected with a suitable supply of gas or the like to heat the said chamber and the top thereof, which forms the bottom for a chamber F, formed in the shell A and adapted to contain an antiseptic solution and provided with a faucet G for drawing off the solution for rendering hypodermic syringes and other instruments antiseptic, as hereinafter more fully described.

From the solution-tank F rises a vapor-chamber H, preferably made cylindrical, and into this chamber extends an instrument-receptacle I, adapted to contain the instruments to be rendered antiseptic, the said receptacle being preferably conical in shape and having a cover I' for closing the top of the receptacle and a bail I² for conveniently removing the receptacle from the vapor-chamber H and replacing it therein whenever desired. The side wall of the receptacle I is provided near its lower end with perforations I³, and similar perforations I⁴ are arranged near the upper end of said wall, so that communication is established between the inside of the receptacle and the space formed between the side walls of the receptacle and the vapor-chamber H.

When the solution contained in the solution-chamber F is heated, vapors emanate from the said solution and gather in the vapor-chamber H and pass from the same into and through the perforations I³ I⁴, so that the antiseptic and germicidal vapors come in contact with the instruments contained in the receptacle I, thus rendering the said instruments antiseptic. The upper end of the receptacle I is provided with a suitable annular bead I⁵, adapted to be seated on the upper edge of the chamber H, so as to suspend the receptacle I in the chamber H in the manner described and for the purpose mentioned. The chamber H is surrounded by a water-heating chamber J, secured to or formed within the shell A, its bottom being over part of the chamber F, so that the heated vapors rising from the solution contained in the chamber F heat the water contained in the chamber J and which heated water can be withdrawn for washing or other purposes through a faucet J', as shown in Fig. 2. The top of the chamber J terminates at the upper end of the chamber H and is provided at one side of the latter with a filling-cap K for filling the chamber J with water. On the other side of the chamber H is arranged in the top of the chamber J a sand vessel L, adapted to contain sand or like material and into which instruments may be inserted for giving the instruments a sand-bath and a mechanical cleaning preparatory to placing the instruments in the receptacle I for final sterilization.

In using the apparatus the cover B is first removed, and the receptacle I is filled with the instruments to be sterilized and is then placed in position in the chamber H, thus closing the same at the upper end and establishing communication between the chamber and the interior of the receptacle. The gas of the burner D is now ignited to heat the antiseptic solution contained in the chamber F and also to heat the water in the chamber, as well as the sand in the sand vessel L. The vapors rising from the antiseptic solution circulate through the receptacle I, and thereby come in contact with the entire surfaces of the instruments, so that the latter are completely rendered antiseptic.

Instruments such as hypodermic syringes are rendered antiseptic by withdrawing a portion of the heated solution from the chamber F and passing the same through the syringe in a suitable manner to accomplish the desired result. If desired, the instrument may be given a sand-bath in the heated sand in the vessel L preparatory to sterilizing the same in the receptacle I, as above explained.

Having thus fully described my invention, I claim as new and desire to secure by Letters Patent—

1. A sterilizer and heater, comprising a casing formed with a heating-chamber in its bottom, a solution-tank above the top of the heating-chamber, a vapor-chamber rising from the center of the solution-tank and having an open upper end, and a water-chamber above the solution-tank and surrounding the vapor-chamber, and an instrument-receptacle fitting in the vapor-chamber and closing the upper end of the same, said receptacle being provided with openings in its sides, and arranged to form a space between it and the vapor-chamber, substantially as described.

2. A sterilizer and heater, comprising a casing formed with a heating-chamber in its bottom, a solution-tank above the heating-chamber, a vapor-chamber rising from the center of the solution-tank and having an open top, an annular water-chamber above the solution-tank and surrounding the vapor-chamber, and a conical instrument-receptacle having a cover for its top and provided with a bead at its upper end for suspending it in the vapor-chamber and with openings in its sides, substantially as described.

3. A sterilizer and heater, comprising a casing provided with a solution-tank, a vapor-chamber rising from the center of the solution-tank and having an open upper end, and an annular water-chamber above the solution-tank and surrounding the vapor-chamber, and a conical perforated instrument-receptacle projecting into the vapor-chamber and closing the upper end of the same, substantially as described.

4. A sterilizer and heater, comprising a casing provided with a solution-tank, a vapor-chamber rising from the center of the solution-tank, and having an open upper end, and an annular water-chamber above the solution-tank and surrounding the vapor-chamber, a perforated receptacle suspended in the vapor-chamber and closing the same, and a sand vessel secured to the top of the water-chamber and depending into the same, substantially as described.

JAMES ALBERT CRONKHITE.

Witnesses:
E. M. HARWOOD,
N. CRONKHITE.